US009232167B2

(12) United States Patent
Cooke et al.

(10) Patent No.: US 9,232,167 B2
(45) Date of Patent: Jan. 5, 2016

(54) VIDEO SYSTEM AND REMOTE CONTROL WITH TOUCH INTERFACE FOR SUPPLEMENTAL CONTENT DISPLAY (75) Inventors: Benjamin T. Cooke, Denver, CO (US); Vincent Dung Nguyen, Castle Rock, CO (US)

(73) Assignee: EchoStar Technologies L.L.C., Englewood, CO (US)

( * ) Notice: Subject to any disclaimer, the term of this patent is extended or adjusted under 35 U.S.C. 154(b) by 399 days.

(21) Appl. No.: 12/535,224

(22) Filed: Aug. 4, 2009

(65) Prior Publication Data

US 2011/0032191 A1 Feb. 10, 2011

(51) Int. Cl.
*H04N 5/44* (2011.01)
*H04N 21/422* (2011.01)
*H04N 21/482* (2011.01)

(52) U.S. Cl.
CPC ....... *H04N 5/4403* (2013.01); *H04N 21/42207* (2013.01); *H04N 21/42209* (2013.01); *H04N 21/42221* (2013.01); *H04N 21/42224* (2013.01); *H04N 21/482* (2013.01); *H04N 2005/441* (2013.01); *H04N 2005/443* (2013.01); *H04N 2005/4407* (2013.01)

(58) Field of Classification Search
USPC .......... 345/156–184, 173–178; 715/716, 719, 715/764, 781, 810
See application file for complete search history.

(56) References Cited

U.S. PATENT DOCUMENTS

| 6,225,984 | B1 | 5/2001 | Crawford |
| 6,246,441 | B1 | 6/2001 | Terakado et al. |
| 2002/0124252 | A1* | 9/2002 | Schaefer et al. ................. 725/33 |
| 2002/0190956 | A1* | 12/2002 | Klein et al. .................... 345/169 |
| 2003/0035075 | A1 | 2/2003 | Butler et al. |
| 2006/0101338 | A1* | 5/2006 | Kates ............................. 715/716 |
| 2006/0146017 | A1 | 7/2006 | Leung et al. |
| 2006/0267995 | A1* | 11/2006 | Radloff et al. ................. 345/530 |
| 2007/0142091 | A1 | 6/2007 | Gasborro et al. |
| 2007/0276925 | A1* | 11/2007 | La Joie et al. ................. 709/219 |
| 2007/0293271 | A1 | 12/2007 | Streeter |
| 2009/0271313 | A1* | 10/2009 | Chaudhari et al. .............. 705/39 |
| 2009/0327880 | A1* | 12/2009 | Ide ................................ 715/261 |
| 2009/0327894 | A1* | 12/2009 | Rakib et al. ................... 715/719 |
| 2010/0013852 | A1* | 1/2010 | Liu ................................ 345/173 |
| 2010/0235786 | A1* | 9/2010 | Maizels et al. ................. 715/810 |
| 2010/0257475 | A1* | 10/2010 | Smith et al. ................... 715/771 |
| 2010/0306171 | A1* | 12/2010 | Antos et al. ................... 715/781 |

FOREIGN PATENT DOCUMENTS

| EP | 1 578 111 A1 | 9/2005 |
| EP | 2462750 A2 | 6/2012 |

OTHER PUBLICATIONS

International Search Report dated Mar. 29, 2011, PCT/US2010/044283, 4 pages.

(Continued)

*Primary Examiner* — Ryan A Lubit
(74) *Attorney, Agent, or Firm* — Kilpatrick Townsend & Stockton LLP (57) ABSTRACT Disclosed herein is a method of operating a remote control system having a touch interface. The method comprises receiving a user input through the touch interface, generating a control communication corresponding to the user input and transferring the control communication from a communication transceiver to remotely control a display of content on a video display system, receiving into the communication transceiver supplemental content for display on the touch interface, and displaying the supplemental content on the touch interface while the video display system displays the content.

19 Claims, 8 Drawing Sheets (56) References Cited

OTHER PUBLICATIONS

Written Opinion of PCT/US2010/044283 mailed Mar. 29, 2011, 4 pages.

Office Action from the Canadian Intellectual Property Office for Application No. 2,769,880 dated Aug. 21, 2014, 3 pages.

Supplementary European Search Report for EP 10807044, dated May 22, 2014, 7 pages.

International Preliminary Report on Patentability for PCT/US2010/044283 issued Feb. 7, 2012, 5 pages.

* cited by examiner

VIDEO SYSTEM AND REMOTE CONTROL WITH TOUCH INTERFACE FOR SUPPLEMENTAL CONTENT DISPLAY

BACKGROUND

Consumer electronics devices, such as televisions, set-top boxes, stereo equipment, and personal computers, continue to expand in popularity. Typically, remote controls are provided with these devices to allow users to control the devices from a distance. As technology has advanced, remote controls have become increasingly user-friendly. Some modern remote controls now include touch interfaces, such as touch pads and touch screens.

Along with the continued growth in popularity of consumer electronics devices, the manner in which a wide variety of content is delivered to users has expanded. For example, video can now be viewed on a wide array of devices, including televisions, laptop computers, hand-held computers, and mobile phones.

Likewise, the delivery of supplemental content, such as advertising, viewing information, or schedule information, has become increasingly sophisticated. For example, advertising relevant to a particular video and formatted for a particular device can be generating in near real-time for delivery and display to a user.

OVERVIEW

Disclosed herein is a method of operating a remote control system having a touch interface. The method comprises receiving a user input through the touch interface, generating a control communication corresponding to the user input and transferring the control communication from a communication transceiver to remotely control a display of content on a video display system, receiving into the communication transceiver supplemental content for display on the touch interface, and displaying the supplemental content on the touch interface while the video display system displays the content.

Also disclosed is a remote control system. The remote control system comprises a touch interface configured to receive a user input, a processing system configured to generate a control communication corresponding to the user input, and a communication transceiver configured to transfer the control communication to remotely control a display of content on a video display system and receive supplemental content for display on the touch interface. The touch interface is further configured to display the supplemental content while the video display system displays the content.

Additionally, a video system is disclosed comprising a remote control device and a video control system. The remote control device is configured to receive a user input through a touch interface, process the user input to generate a control communication, wirelessly transfer the control communication to remotely control display of content on a video display system, wirelessly receive supplemental content, and display the supplemental content through the touch interface. The video control system is in communication with the remote control device and is configured to wirelessly receive the control communication, receive the content from a content delivery system, and receive supplemental content for display by the touch interface, in response to the control communication transfer the content to the video display system, and transfer the supplemental content to the remote control device

BRIEF DESCRIPTION OF THE DRAWINGS

Many aspects of the present disclosure may be better understood with reference to the following drawings. The components in the drawings are not necessarily depicted to scale, as emphasis is instead placed upon clear illustration of the principles of the disclosure. Moreover, in the drawings, like reference numerals designate corresponding parts throughout the several views. Also, while several embodiments are described in connection with these drawings, the disclosure is not limited to the embodiments disclosed herein. On the contrary, the intent is to cover all alternatives, modifications, and equivalents.

DETAILED DESCRIPTION

The enclosed drawings and the following description depict specific embodiments of the invention to teach those skilled in the art how to make and use the best mode of the invention. For the purpose of teaching inventive principles, some conventional aspects have been simplified or omitted. Those skilled in the art will appreciate variations of these embodiments that fall within the scope of the invention. Those skilled in the art will also appreciate that the features described below can be combined in various ways to form multiple embodiments of the invention. As a result, the invention is not limited to the specific embodiments described below, but only by the claims and their equivalents.

Figure 1:
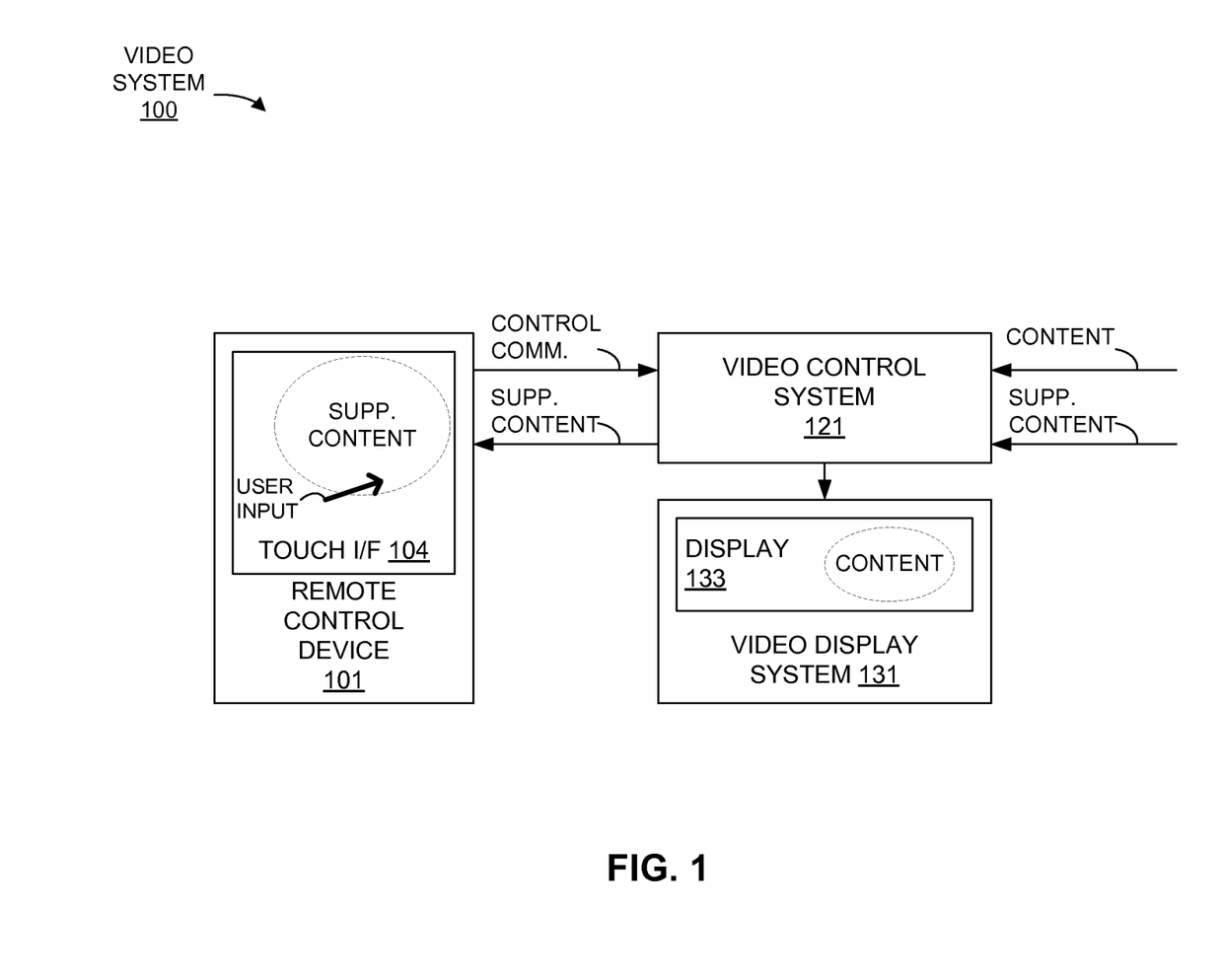
FIG. 1 is a block diagram of a video system according to an embodiment.

FIG. 1 illustrates video system 100 in an embodiment. Video system 100 includes remote control device 101, video control system 121, and video display system 131. Remote control device 101 includes touch interface 104. Video display system 131 includes display 133. Remote control device 101 communicates with video control system 121 to control the operation of video display system 131.

Referring to FIG. 1, remote control device 101 comprises touch interface 104, circuitry, and other processing elements capable of receiving user inputs, generating and transferring control communications, and receiving and displaying supplemental content. Touch interface 104 includes interface circuitry and other processing elements capable of receiving user inputs and displaying supplemental content. Touch pads and touch screens are examples of touch interface 104.

Video control system 121 comprises circuitry and other processing elements capable of receiving content, control communications, and supplemental content, and transferring the content and supplemental content for display. Examples of video control system 121 include set-top-boxes, cable modems, gaming stations, and digital video recorders, as well as other types of video control systems Video display system 131 comprises display 133, as well as other circuitry and display elements capable of receiving and displaying content from video control system 121. Examples of video display systems include television sets, computer monitors, and the like. It should be understood that video display system 131 and video control system 121 could be separate devices or could be integrated in a single device.

Figure 2:
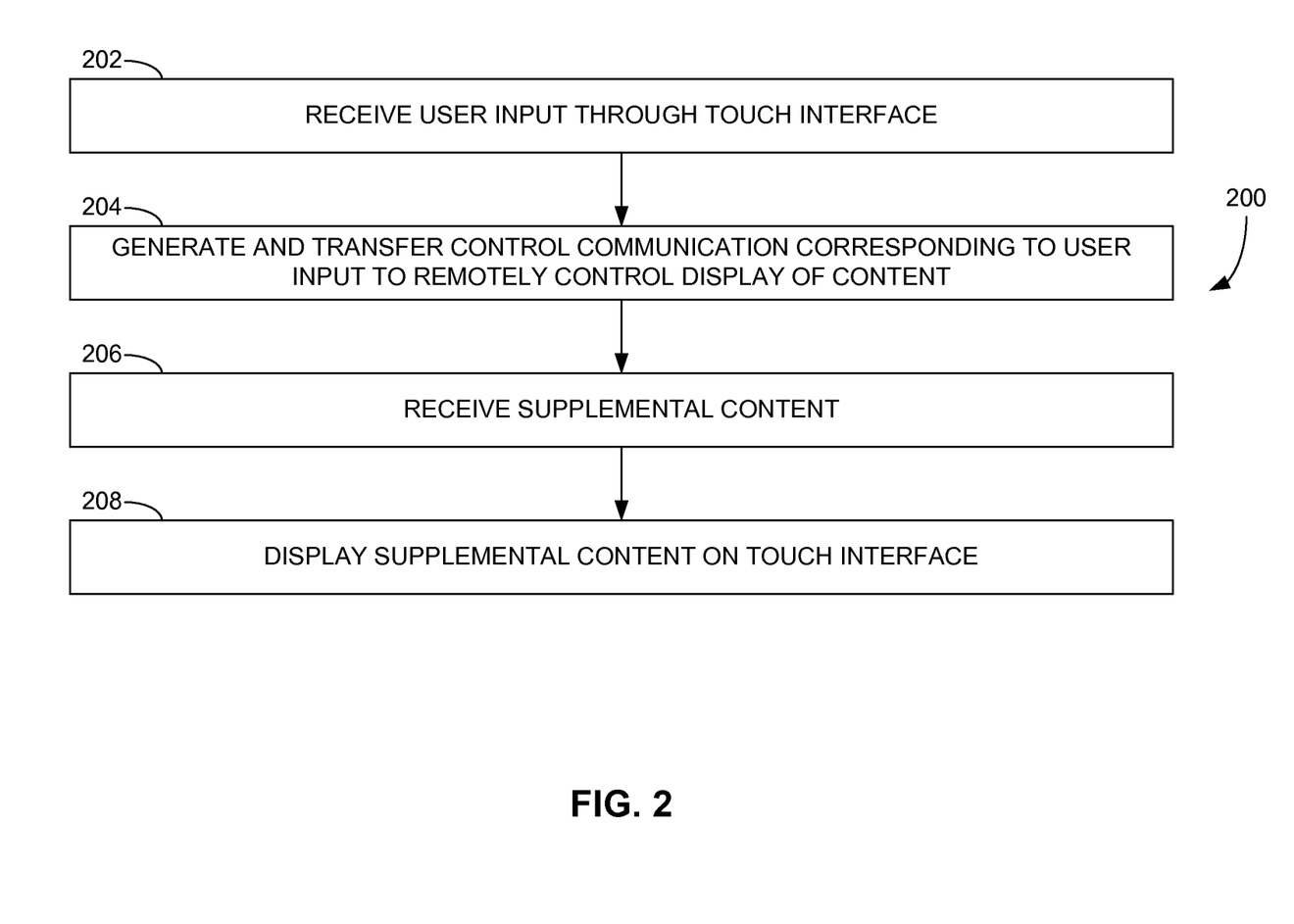
FIG. 2 is a flow diagram of a method for operating the video system of FIG. 1.

FIG. 2 illustrates process 200 for the operation of video system 200. In operation, a user operates remote control device 101 to control the display of content on display 133. Remote control device 101 receives user input provided by a user through touch interface 104 (202). Corresponding to the user input, remote control device 101 generates and transfers control communications to remotely control the display of content (204).

Remote control device 101 transfers the control communications to video control system 121 to control the display of content. The content is received by video control system 121 from a content source, such as a satellite, cable, or Internet television provider. In accordance with the control communications, video control system 121 transfers the content to video display system 131 for display by display 133.

In addition, video control system 121 receives supplemental content. The supplemental content is received by video control system 121 from a supplemental content source. Examples of supplemental content sources include satellite, cable, or Internet television providers, as well as advertising or governmental, or any other type of supplemental content source. Video control system 121 transfers the supplemental content to remote control device 101. Remote control device 101 receives the supplemental content (206) and displays the supplemental content on touch interface 104 (208).

Figure 3:
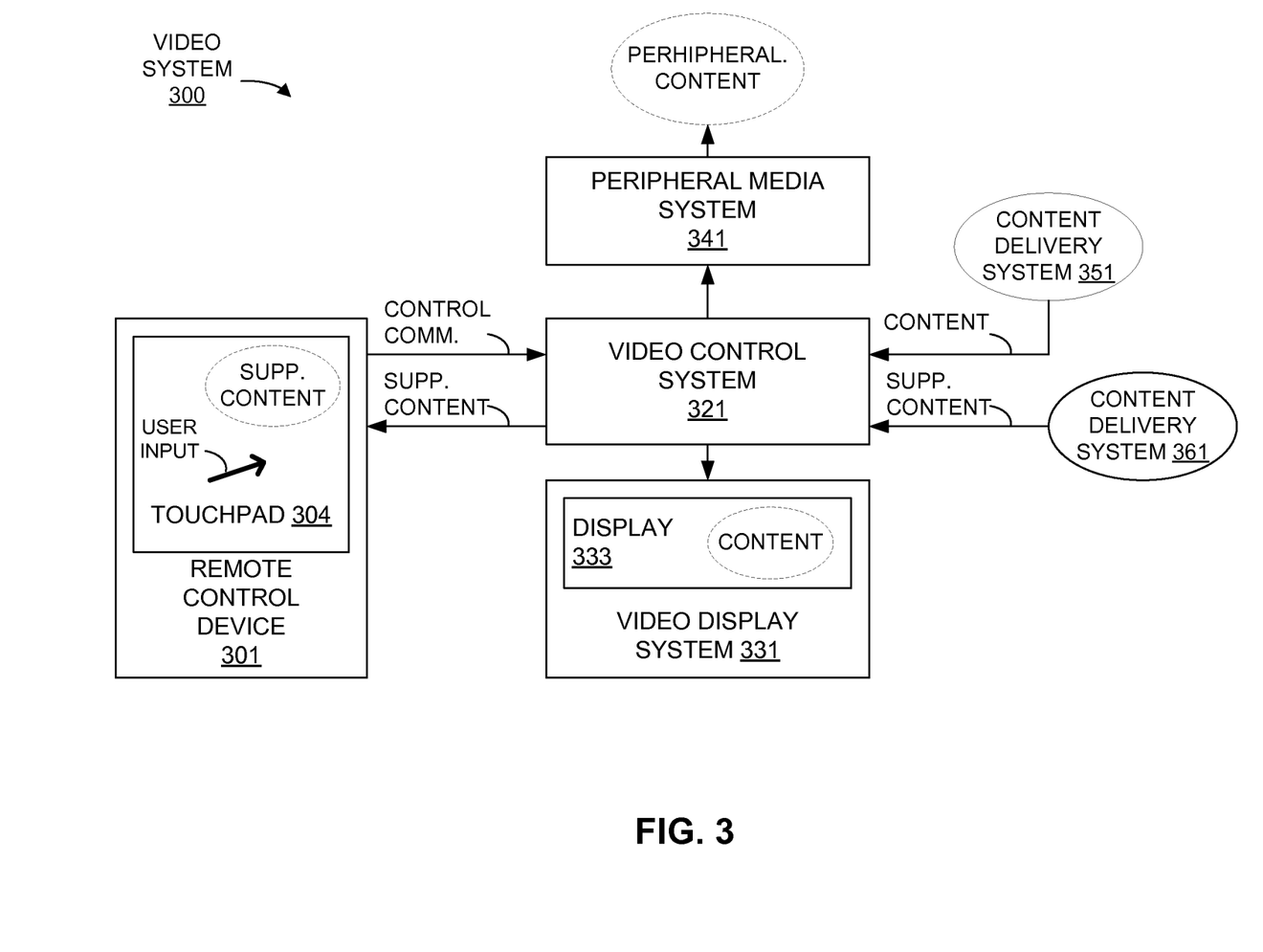
FIG. 3 is a block diagram of a video system according to an embodiment.

FIG. 3 illustrates video system 300 in an embodiment. Video system 300 includes remote control device 301, video control system 321, video display system 331, peripheral media system 341, content delivery systems 351, 361. Remote control device 301 includes touchpad 304 and video display system 331 includes display 333. Remote control device 301 is in communication with video control system 321. Video control system 321 operatively communicates with video display system 331, peripheral media system 341, and content delivery systems 351, 361.

Figure 4:
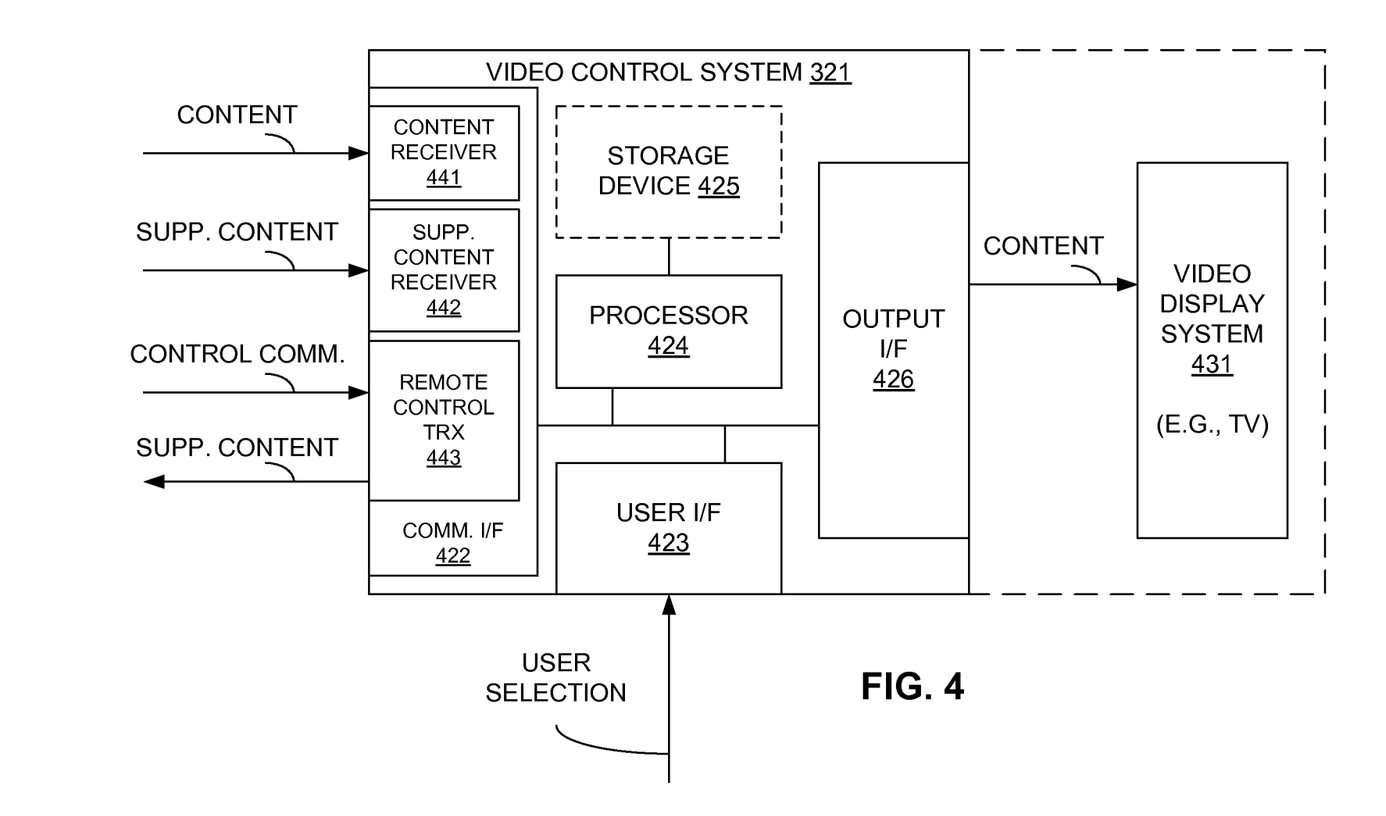
FIG. 4 is a block diagram of a video control system in an embodiment.

FIG. 4 provides a block diagram of a video control system 321. Video control system 321 includes at least a communication interface 422, an output interface 426, a user interface 423, and a processor 424. Optionally, video control system 321 may include a storage device 425, described in greater detail below.

Examples of the video control system 321 of FIG. 4 include, but are not limited to, satellite, cable and terrestrial television set-top boxes; television sets, monitors, and video displays; digital video disc (DVD) players; digital video recorders (DVRs); and computers. As a result, circuitry normally associated with such devices may be present in video control system 321, but is not explicitly illustrated in FIG. 4. For example, in the case of a satellite set-top box, video control system 321 may include one or more tuners, as well as descrambling and decoding circuitry, in communication interface 422. Video control system 321 may also incorporate DVR functionality, as well as other circuitry typically incorporated into satellite set-top boxes, that is not shown in FIG. 4. Such detail is not described or depicted in FIG. 4 to simplify and facilitate the following discussion.

Video control system 321 is coupled with a video display system 431, such as a television set, monitor, or another video display. While video display system 431 is shown as being physically separate from video control system 321, the two devices 400, 431 may be integrated as a single system, such as in a television set or laptop computer system.

Communication interface 422 includes content receiver 441, supplemental content receiver 442, and remote control transceiver 443. Communication interface 422 of video control system 321 is configured to receive content, supplemental content, and control communications. Communication interface 422 is also configured to transfer supplemental content.

Content receiver 441 may include circuitry and other processing components capable of receiving content from a transmission system, such as a satellite, a server computer, a cable head-end transmission system, antenna, cable television feed, optical fiber link, Internet interface, or some other media transmission system. For example, content receiver 441 may be a cable modem capable of receiving cable television signals from a cable network. In another example, content receiver 441 may be a digital receiver capable of receiving digital broadcast television signals over-the-air from a terrestrial digital broadcast system. In yet another example, content receiver 441 may be an Internet modem, such as a cable or DSL modem, capable of receiving Internet protocol (IP) communications from a server located on a network. Variations and combinations of these examples are possible.

In one example, video control system 321 may be a satellite set-top box. In this case, content interface 441 may include circuitry for receiving a satellite signal from an antenna, down-converting the signal, selecting a particular transponder frequency, descrambling and/or decoding the data packets of the signal, selecting those data packets associated with a particular programming channel, and so on. Thus, the satellite signal may include content embedded therein.

Supplemental content receiver 442 may also include circuitry and other processing components capable of receiving content from a transmission system, such as a satellite, a server computer, a cable head-end transmission system, antenna, cable television feed, optical fiber link, Internet interface, or some other media transmission system. For example, supplemental content interface 442 may be a cable modem capable of receiving cable television signals from a cable network. In another example, supplemental content interface 442 may be a digital receiver capable of receiving digital television signals over-the-air. In yet another example, supplemental content interface 442 may be an Internet modem, such as a cable or DSL modem, capable of receiving Internet protocol (IP) communications from a server located on a network. Variations and combinations of these examples are possible.

Remote control transceiver 443 comprises Radio Frequency (RF) communication circuitry and an antenna. The RF communication circuitry typically includes an amplifier, filter, RF modulator, and signal processing circuitry. Remote control transceiver 443 may also include a memory device, software, processing circuitry, or some other communication device. Remote control transceiver 443 may use IEEE 802.15.1, IEEE 802.15.4, or some other wireless communication format. In alternative configurations, infrared communications may be used instead of RF communications. Remote control transceiver 443 receives control communications as described herein. Remote control transceiver 443 includes a remote control receiver and transmitter.

In one implementation, video control system 321 may incorporate one of the Motion Picture Experts Group (MPEG) standards for data encoding and compression, such as MPEG-2 or MPEG-4. Other data formatting or encoding methods, both analog and digital, may be employed in other embodiments.

Output interface 426 of video control system 321 is configured to transmit at least the content received by communication interface 422 to video display system 431. Typically, output interface 426 is configured to reformat the received content so that the content may be processed by video display system 431 for presentation to a user. For example, the content may take the form of audio and video data suitable for transport over one or more of several audio/video connections, including, but not limited to, coaxial cable, composite video with separate audio channels, component video with separate audio channels, and the High-Definition Multimedia Interface (HDMI).

User interface 423 may comprise any suitable components that allow a user to control video control system 321 directly, as opposed to operating a remote control device. User interface 423 may comprise buttons, keys, or the like.

Within video control system 321, communicatively coupled with each of the communication interface 422, the output interface 426, and the user interface 423, is processor 424. In one embodiment, processor 424 may be one or more microprocessors, microcontrollers, digital signal processors (DSPs), or any other processor configured to execute software instructions for performing the various tasks identified with the processor 424, such as coordinating the activities of the other components of video control system 321, as well as the specific operations discussed in greater detail below. The software may be stored in a data storage device, such as storage device 425 shown in FIG. 4, or a memory located internal to processor 424. In another example, processor 424 may be a collection of hardware logic circuitry to perform the functions described below, or a combination of software and hardware elements.

Storage device 425, if included in video control system 321, may incorporate one or more types of data storage, such as static random access memory (SRAM), dynamic random access memory (DRAM), flash memory, or other integrated circuit (IC) based memory; optical or magnetic disk memory; or any other type of storage device or system capable of storing data. In another embodiment, storage device 425 may include network-attached storage to which video control system 321 may be coupled through communication interface 422 or other suitable connection.

Figure 5:
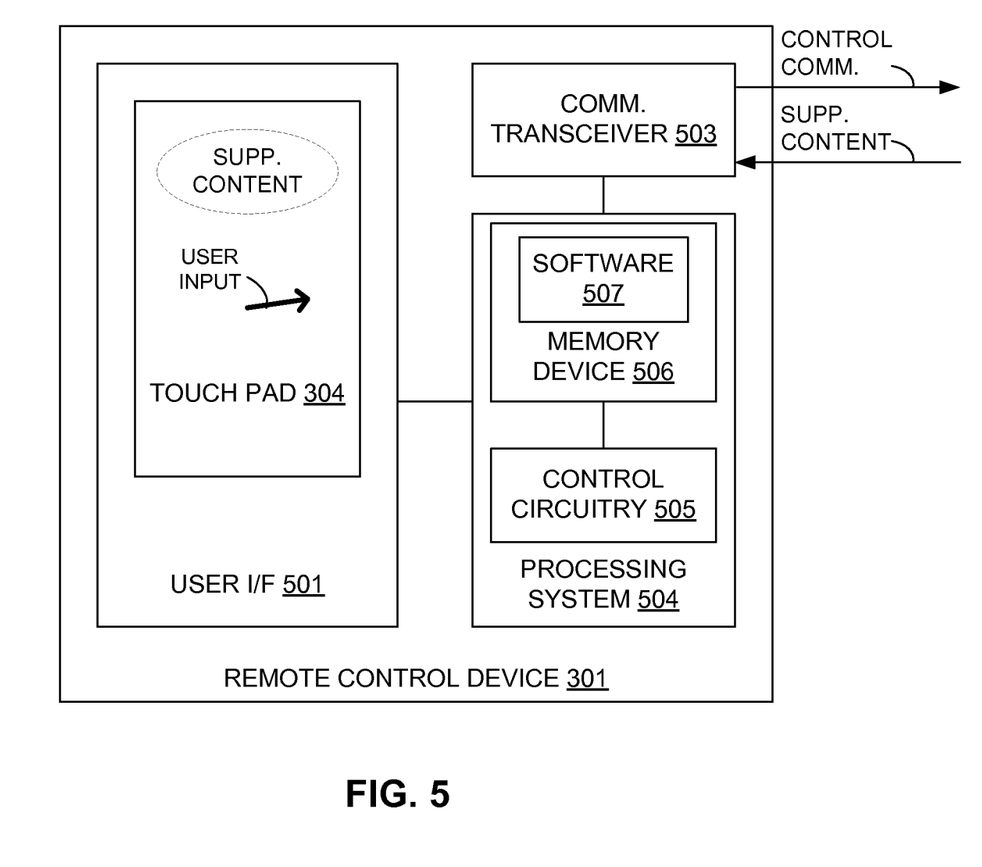
FIG. 5 is a block diagram of a remote control device according to an embodiment.

FIG. 5 illustrates remote control device 301. Remote control device 301 is an example of remote control device 101, although remote control device 101 could use alternative configurations. Remote control device 301 exerts control over a set-top box, video game console, audio system, Internet appliance, or some other media device—including combinations thereof.

Remote control device 301 comprises user interface 501, communication transceiver 503, and processing system 504. User interface 501 includes touchpad 304. Processing system 504 is linked to user interface 501 and communication transceiver 503. Processing system 504 includes control circuitry 505 and memory device 506 that stores operating software 507. Remote control device 301 may include other well-known components such as a battery and an enclosure that are not shown for clarity.

User interface 501 comprises components that interact with a user to receive user inputs and present information to the user. User interface 501 includes touchpad 304 and may also include switches, keys, lights, or some other user input/output apparatus—including combinations thereof. Touchpad 304 includes a capacitive touch surface and processing circuitry. The capacitive touch surface is allocated into an X-Y grid. The touch of a finger at a point on the grid creates capacitance at that point on the grid. The processing circuitry processes signals resulting from the capacitance to identify the X-Y coordinates corresponding to touched locations. The processing circuitry may also process the signals to time stamp the coordinates and to determine the associated pressure of the touch. Based on the timing and motion of the touch sequence, the processing circuitry can also distinguish touches between taps and scrolls. Touchpad 304 may also employ a display technology, such as electronic ink, to display images, graphics, logos, text, or the like. Electronic ink may be commonly referred to as e-ink.

Communication transceiver 503 comprises Radio Frequency (RF) communication circuitry and an antenna. The RF communication circuitry typically includes an amplifier, filter, RF modulator, and signal processing circuitry. Communication transceiver 503 may also include a memory device, software, processing circuitry, or some other communication device. Communication transceiver 503 may use IEEE 802.15.1, IEEE 802.15.4, or some other wireless communication format. In alternative configurations, infrared communications may be used instead of RF communications. Communication transceiver 503 transfers messages to the controlled device that indicate user inputs, including inputs through touchpad 304.

Processing circuitry 504 comprises microprocessor circuitry, power circuitry, communication lines, and other circuitry. The microprocessor circuitry retrieves and executes operating software 507 from memory device 506. Memory device 506 comprises a flash drive, data storage circuitry, or some other memory apparatus. Processing circuitry 504 is typically mounted on a circuit board that may also hold memory device 506 and portions of user interface 501 and communication transceiver 503.

Operating software 507 comprises computer programs, firmware, or some other form of machine-readable processing instructions. Operating software 507 may include an operating system, utilities, drivers, network interfaces, applications, or some other type of software. When executed by control circuitry 505, operating software 507 directs processing system 504 to operate remote control device 301 as described herein.

In operation, video control system 321 receives content for display on video display system 331 in accordance with control communications transferred by remote control device 301. For example, a user operating remote control device 301 may provide a user input, as shown by a dark arrow within touch interface 304. Remote control device 301 generates control communications corresponding to the user input, such as instructions to change channels, increase or decrease volume, view menus, select menu options, or other instructions well known in the art.

Remote control device 301 transfers the control communications to video control system 321. Video control system 321 controls the display of the content on display 333 based on the control communications. For instance, the content received by video control system 321 from content delivery system 351 may comprise a variety of video channels, while the control communications may indicate a selection of one of the video channels for viewing. In this case, video control system 321 operates according to well known techniques so that the selected channel is displayed on display 333.

As is also shown in FIG. 3, video control system 321 receives supplemental content for display by touch interface 304 from content delivery system 361. Video system 321 is capable of transferring the supplemental content to remote control device 301. Remote control device 301 receives and displays the supplemental content on touch interface 304.

The supplemental content may comprise a variety of types of content, such as graphical pictures, animated graphics, or text, as well as any combination or variation thereof. For example, the supplemental content may comprise graphics, text, or animation that corresponds to the main content displayed by display 333. For instance, the supplemental content may be a graphical logo for the network providing the content. In another example, the supplemental content may be a graphical logo for the production studio that produced the content. In yet another example, the supplemental content may be production information for the content, such as the rating of the content, production date, an original air date, or the like. Other supplemental content that corresponds to the content may include the names of actors involved in a performance contained in the content, such as the actors in a movie or television show.

Advertising is another example of supplemental content. For instance, the content displayed by display 333 may be an advertisement by an advertiser shown during a commercial break during a television show. The supplemental content could thus be a graphical logo for the advertiser, such as a company logo or a product brand. In another example, the supplemental content could be a coupon for a product shown within the advertisement displayed by display 333. It should be understood that the advertizing need not correspond to the content. Rather, the advertising could merely be supplemental advertising that does not correspond to the content in any way.

User information is yet another example of supplemental content. Examples of user information include billing information, viewing history, rating settings, parental control information, or the like. For instance, it is known that a particular video control system, such as a set-top box, is associated with a particular customer. Billing information for that customer could be transferred to video control system 321, and then from video control system 321 to remote control device 301 for display on touch interface 304. Late payment notices, pay-per-view prices, payment schedules, and other rate information are examples of billing information that could be displayed through touch interface 304.

It should be understood that a wide variety of types and kinds of supplemental content are possible and should not be limited by the examples given herein. It should also be understood that the content and supplemental content could be delivered to video control system 321 in a variety of ways. For example, a single or multiple terrestrial or non-terrestrial transmission systems may provide the content to video control system 321. Likewise, a single or multiple terrestrial or non-terrestrial systems may provide the supplemental content to video control system 321. Hybrid terrestrial and non-terrestrial systems may also be used to deliver content and supplemental content to video control system 321.

Along with the variety of transmission systems that could be used to deliver content to video control system 321, a number of transmission techniques may also be used. Content may be transmitted in real-time to video control system 321 for viewing by a user proximate in time to when the video is transmitted. It should be understood that time-shifting devices may be utilized to delay or otherwise change when such video is viewed. Content may also be transmitted well before a user intends to view the content, such as may be the case with movie downloads.

Supplemental content may also be delivered to video control system 321 in a variety of ways, such as in real-time nearly simultaneously with the delivery of the content. In the case of delayed viewing of content due to the use of a time-shifting device, the supplemental content may have been delivered to video control system 321 when the content was initially delivered. However, video control system 321 could be programmed to obtain the supplemental content at the time of viewing time-shifted content. In such as case, the supplemental content would be delivered to video control system 321 well after the content had been delivered, but the supplemental content would be displayed and viewed nearly simultaneously with the time-shifted content.

As shown in FIG. 3, the user input, such as a touch or gesture, can be received within, on, or nearby the same surface area of touch interface 304 where the supplemental content is displayed. The user input may be received before or after when the supplemental content is displayed. However, the user input may also be received at the same time as, or simultaneously with, when the supplemental content is displayed.

In an example, a user operating remote control device 301 may provide a user input, such as by tapping touch interface 104, dragging a finger along touch interface 304, or otherwise generating a touch or gesture. In this example, the user input is provided prior to the display of supplemental content. After the user input is received and corresponding control communications transferred to video control system 321, video control system 321 directs content to display 333. Video control system 321 then also transfers supplemental content to remote control device 301 for display on touch interface 304.

In another example, the user input may be provided while supplemental content is displayed by touch interface 304. For instance, touch interface 304 may display an ad or logo over which the user provides a gesture. In such as case, the gesture results in corresponding control communications that are transferred to video control system 321 to control some aspect of the display of content. New supplemental content may be provided to remote control device 101 in response the control communications, such as a new ad or logo for display by touch interface 104. However, it should be understood that the same supplemental content may be used and displayed.

In yet another example, a user may direct peripheral media system 341 to generate or produce peripheral content. For instance, peripheral media system 341 may be a printer or other such device capable of producing tangible content. Supplemental content displayed by touchpad 304 may comprise a coupon related to an advertisement displayed by display 633. By way of remote control device 301, the user may direct video control system 321 to provide the supplemental content to peripheral media system 341. The supplemental content, such as a coupon, may be transferred in a picture format, such as a jpeg or bmp file. Peripheral media system 341 would receive, process, and print the image contained in the file. In this manner, the user could view coupons displayed on touch pad 304 and print the coupons via peripheral media system 341.

Figure 6:
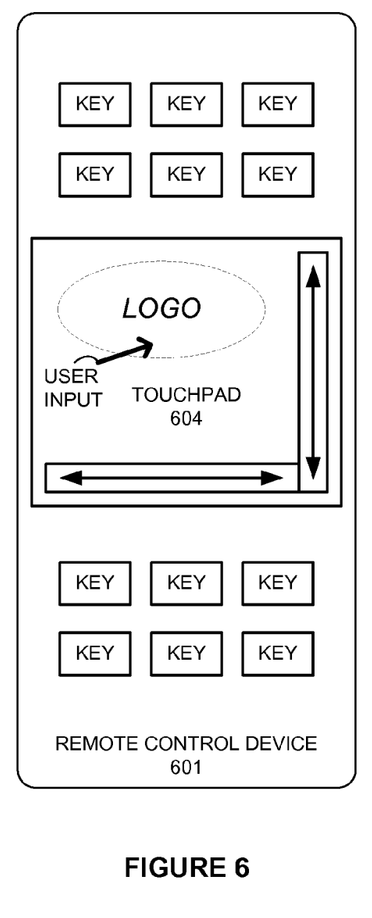
FIG. 6 illustrates a remote control device according to an embodiment.

FIG. 6 illustrates remote control device 601 having touchpad 604. Remote control device 601 is a handheld device. Remote control device 601 has control keys for power on/off, channel up/down, volume up/down, program guide, directional arrows up/down/right/left, play, reverse, fast forward, and the like. Touchpad 604 can emulate several of these keys when combined with a graphic display. For example, the user may trace their finger up touchpad 604 to emulate a channel up command. Note that touchpad 604 has a vertical scroll bar and a horizontal scroll bar.

As shown in FIG. 6, a user may provide a user input, which is indicated by a bold arrow. In FIG. 6, the arrow representing a user touch or gesture occurs within at least a portion of the same surface area where a logo—or supplemental content—is displayed. In this drawing, the user input is received while the logo is displayed. The user input may ultimately control the movement of a cursor or other directional icon on a display.

Figure 7A:
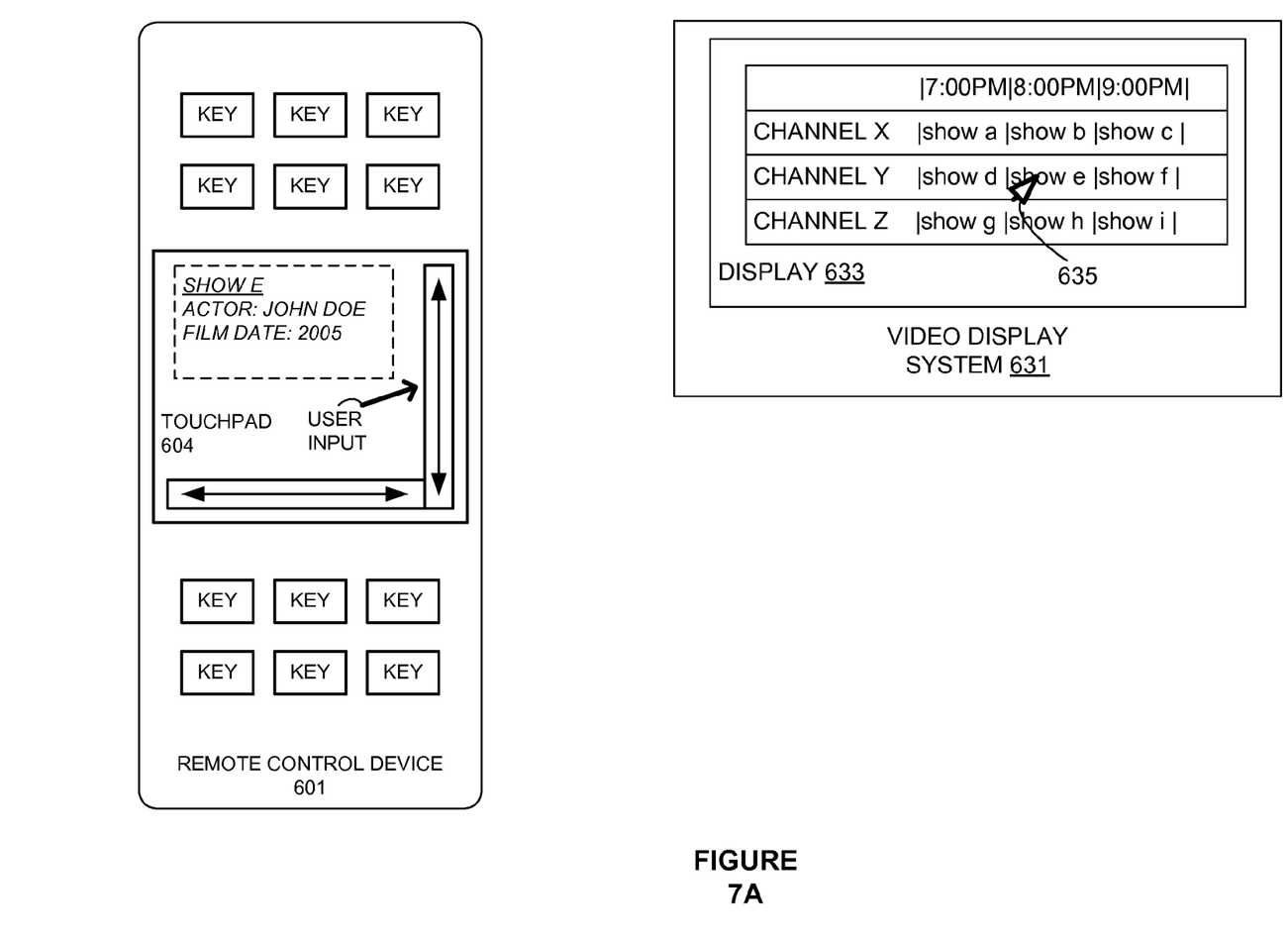
FIG. 7A illustrates a remote control device and a video display system according to an embodiment.

FIG. 7A illustrates one such example whereby a user input controls the movement of a cursor 635 on a display 633. In this example, remote control device 601 communicates with a video control system (not shown) to control where cursor 635 is located on display 633. In this example, a viewing menu is displayed by display 633, showing the schedule of content for several channels. In particular, three time slots are shown: 7:00 PM, 8:00 PM, and 9:00 PM. Likewise, three channels are shown: channel x, channel y, and channel z. Thus, there are nine shows that could be viewed during nine viewing slots defined by channel and time: show a, show b, show c, show d, show e, show f, show g, show h, and show i. It should be understood that this menu is merely representative of menus in general and a wide variety of menus or guides is contemplated.

In this example, a user operating remote control device 601 has provided a user input via touch pad 604 to control the location of cursor 635. As a result, cursor 635 is located over show e. As can be seen from remote control device 601, touch pad 604 displays supplemental content associated with show e. Namely, an actor(s) name, "John Doe", and the film date, "2005", are displayed. These are examples of supplemental content that corresponds to the main content—the show itself.

As is well known, the user could select show e for viewing. In such a case, the video control system would direct content for show E to display system 633 for viewing.

Figure 7B:
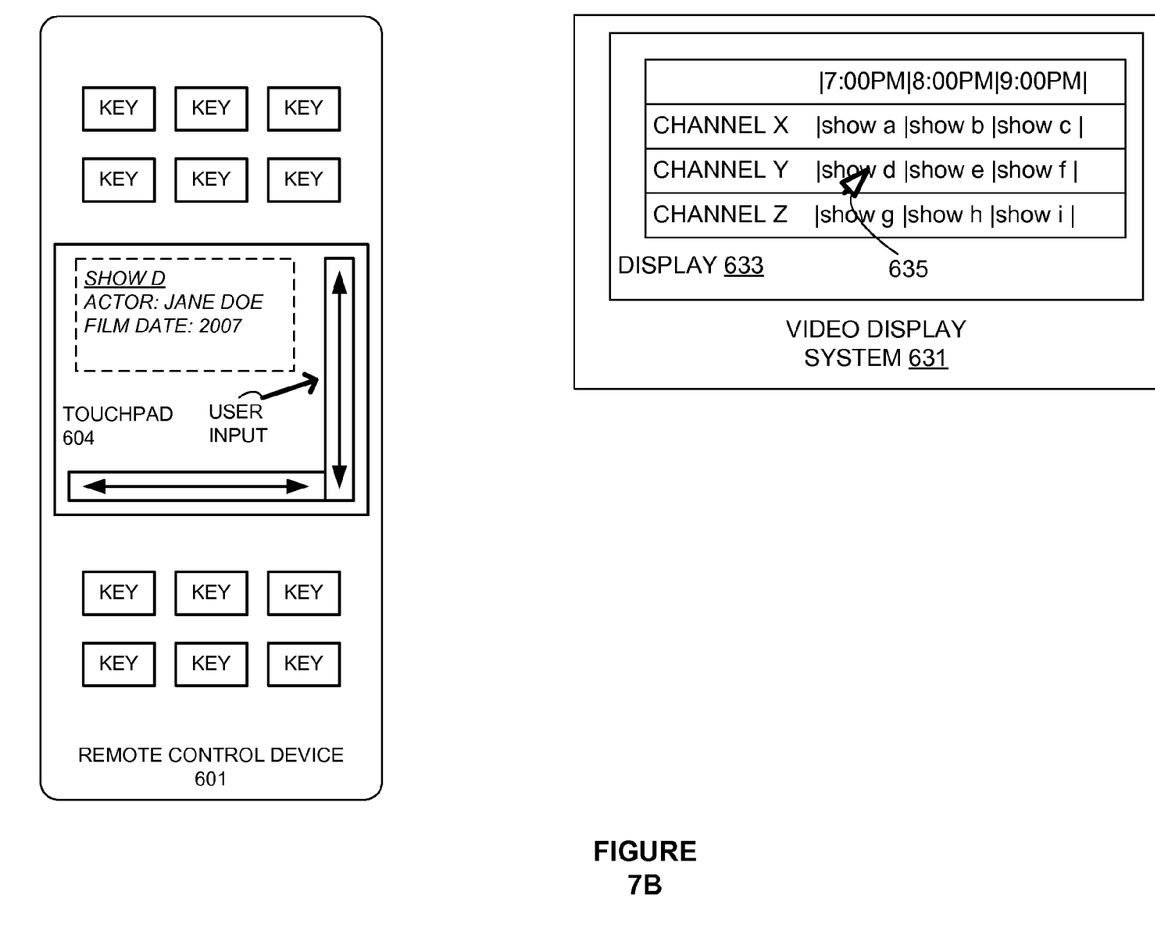
FIG. 7B illustrates a remote control device and a video display system according to an embodiment.

However, the user may provide additional user input to move the location of cursor 635 relative to the menu on display 633. Referring to FIG. 7B, an example is provided whereby, with respect to FIG. 7A, the user has provided a user input to move cursor 635 so that it hovers over show d. In this case, the supplemental content displayed on touch pad 604 changes. Now, the actor name "Jane Doe" and film date "2007" are displayed, since the supplemental content for each of show d and show e is different.

In other words, the supplemental content displayed by touch pad 604 corresponds to the location or position of cursor 635 relative to items on a menu displayed by display 633.

It should be understood that the position of cursor 635 would be known by the video control system that drives display 633. The video control system 321 would process the position of cursor 635 to determine which item cursor 635 is near. The video control system 321 would then request or retrieve supplemental content associated with that item. For example, if cursor 635 hovers near a show listing, then the video control system 321 would obtain supplemental content corresponding to that show listing, and provide the supplemental content to remote control device 601 for display through touch pad 604.

In a satellite broadcast example, a remote control device may include a touchpad as a replacement for many of the keys, such as the numeric keypad, typically found on present remote control devices. This remote control device may both transmit to a set-top box (STB), but also receive data back, such as acknowledgements to commands, and other information.

Included with this remote control device may be a controllable display overlay on the touchpad to provide advertisements and other information (such as current channel logo) to relay information to the user without involving the TV screen. For example, the remote control device may display supplemental information, wherein the information comes from the device being controlled (e.g., STB, gaming system, television, etc.), which the device receives from some other source (e.g., from the uplink center by way of the satellite or phone connection, from a server by way of the Internet, etc.).

A variety of types of information could be displayed, such as advertisements (possibly related to current channel or current content), current channel logo, a schedule on the current channel over the next few hours, sports scores, news or weather information, stock quotes, etc., as well as almost anything else of interest.

Data may be sourced to the device being controlled by the remote by way of a single server, such as the satellite uplink center, or from multiple sources, such as various servers on the Internet. Data could depend on which channel or program is being watched at the time.

Even beyond a satellite broadcast example, such a touchpad with supplemental information overlaid onto the control surface could be applied to home security systems with a keypad interface, a DVD screen coupled to a main device in a car, etc.

It should be understood that the display surface (overlay) and the control surface (touchpad) are combined. One example of this may be the e-ink technology being used on the e-book readers that requires little power to maintain its image (http://www.eink.com/). Such low power requirements are ideal for a battery-powered remote control.

Electronic ink is a material that is processed into a film for integration into electronic displays, such as on a remote control device. Using millions of tiny microcapsules, each microcapsule contains positively charged white particles and negatively charged black particles suspended in a clear fluid. When a negative electric field is applied, the white particles move to the top of the microcapsule where they become visible to the user. This makes the surface appear white at that spot. At the same time, an opposite electric field pulls the black particles to the bottom of the microcapsules where they are hidden. By reversing this process, the black particles appear at the top of the capsule, which now makes the surface appear dark at that spot.

To form an electronic ink display, the ink is printed onto a sheet of plastic film that is laminated to a layer of circuitry. The circuitry forms a pattern of pixels that can then be controlled by a display driver.

Thus, for example, a remote control device may contain such circuitry to drive an electronic ink display. The remote control device would receive an image, animation, text, or some other type of supplemental information from a video control system. Via the circuitry and other processing elements, the supplemental information would be displayed by the electronic ink.

The entity that maintains control over what supplemental information is displayed could vary. In one example, the user may control which type of content is displayed on the remote, such as by way of a menu screen provided by the STB. In another example, the satellite service provider may maintain control over what information is provided. What is displayed may also depend upon the profile of the user.

While several embodiments of the invention have been discussed herein, other implementations encompassed by the scope of the invention are possible. For example, while various embodiments have been described primarily within the context of satellite broadcast communication networks, such as for television and radio broadcasts, other satellite-based networks not specifically involving the distribution of audio/video programming may benefit from application of the various concepts presented herein. In addition, aspects of one embodiment disclosed herein may be combined with those of alternative embodiments to create further implementations of the present invention. Thus, while the present invention has been described in the context of specific embodiments, such descriptions are provided for illustration and not limitation. Accordingly, the proper scope of the present invention is delimited only by the following claims and their equivalents.

What is claimed is:

1. A method of operating a remote control system having a touch interface, the method comprising:
receiving a user input through the touch interface;
generating a control communication corresponding to the user input and transferring the control communication from a communication transceiver to remotely control a display of content on a video display system;
receiving at the touch interface, an additional user input comprising a continuous movement user input;
generating at least one control communication corresponding to the continuous movement user input and transferring the control communication from the communication transceiver to remotely control the display of content on a video display system;
receiving, into the communication transceiver, a plurality of supplemental content objects for display on the touch interface; and
displaying one or more objects of the plurality of supplemental content objects on the touch interface while the video display system displays the content, wherein the continuous user input is received through the touch interface while at least one supplemental content object of the plurality of supplemental content objects is displayed on the touch surface, and wherein the at least one supplemental content object of the plurality of supplemental content objects displayed on the touch interface changes to at least one other supplemental content object of the plurality of supplemental content objects corresponding to a changed position of the continuous movement user input.

2. The method of claim 1 further comprising receiving another user input through the touch interface while displaying the at least one other supplemental content object of the touch interface, generating another control communication corresponding to the other user input, and transferring the other control communication from the communication transceiver to further remotely control the display of the content on the video display system.

3. The method of claim 1 further comprising receiving another user input through the touch interface while displaying the at least one other supplemental content object of the touch interface, generating another control communication corresponding to the other user input, and transferring the other control communication from the communication transceiver to control generation of peripheral content by a peripheral media system.

4. The method of claim 1 wherein the touch interface comprises a touch pad.

5. The method of claim 1 wherein the touch interface comprises a touch screen.

6. The method of claim 1, wherein the supplemental content object is unrelated to the content on the video display system.

7. The method of claim 6, wherein the supplemental content object includes user-specific viewing history information associated with a particular customer account of a satellite television provider.

8. The method of claim 1, wherein the continuous movement user input comprises a dragging motion from a first position to a second position along the touch interface.

9. The method of claim 8, wherein the supplemental content object displayed changes to the at least one other supplemental content object corresponding to an internal position along the touch interface between the first position and the second position.

10. A remote control system comprising:
a touch interface configured to receive a first user input, and a second user input comprising a continuous movement user input;
a processing system configured to generate at least one control communication corresponding to each of the user inputs; and
a communication transceiver configured to:
transfer each control communication to remotely control display of an electronic programming guide that has a listing of content available for viewing from multiple channels at different time slots and of particular content on a video display system; and
receive a plurality of supplemental content objects for display on the touch interface;
the touch interface further configured to display at least one supplemental content object of the plurality of supplemental content objects while the video display system displays the particular content, wherein the touch interface is configured to receive the continuous user input concomitantly with display of the at least one supplemental content object, and wherein the at least one supplemental content object of the plurality of supplemental content objects displayed on the touch interface changes to at least one other supplemental content object of the plurality of supplemental content objects corresponding to a changed position of the continuous movement user input.

11. The remote control system of claim 10 wherein the touch interface is further configured to receive another user input while displaying the at least one other supplemental content object of the touch interface, and wherein the processing system is further configured to generate another control communication corresponding to the other user input, and wherein the communication transceiver is further configured to transfer the other control communication to further remotely control the display of the content on the video display system.

12. The remote control system of claim 10 wherein the touch interface is further configured to receive another user input while displaying the at least one other supplemental content object of the touch interface, and wherein the processing system is further configured to generate another control communication corresponding to the other user input, and wherein the communication transceiver is further configured to transfer the other control communication to control generation of peripheral content by a peripheral media system.

13. The remote control system of claim 10 wherein the touch interface comprises a touch pad.

14. The remote control system of claim 10 wherein the touch interface comprises a touch screen.

15. A video system comprising:
a remote control device configured to receive a first user input and a second user input that comprises a continuous movement user input through a touch interface, process the user input to generate at least one control communication to playback particular content corresponding to each of the user inputs, wirelessly transfer each control communication to remotely control playback of the particular content on a video display system, and display supplemental content objects through the touch interface, wherein the touch interface is configured to receive the continuous movement user input concomitantly with display of at least one supplemental content object, and wherein the at least one supplemental content object displayed on the touch interface changes to at least one other supplemental content object corresponding to a changed position of the continuous movement user input; and a video control system in communication with the remote control device and configured to wirelessly receive the control communication, receive the particular content from a content delivery system and store the particular content as recorded content, receive a plurality of supplemental content objects for display by the touch interface, control display of the particular content on the video display system based on the control communication, and transfer the supplemental content to the remote control device, wherein the supplemental content objects are obtained separately from the particular content in response to receiving the control communication to playback the recorded content, and is stored on the video control system until the particular content is displayed on the video display system.

16. The video system of claim 15 wherein:

the remote control device interface is further configured to receive another user input through the touch interface while displaying the at least one other supplemental content object on the touch interface, generate another control communication corresponding to the other user input, and transfer the other control communication to control generation of peripheral content by a peripheral media system; and the video control system is configured to receive information about the peripheral content from another content delivery system, receive the other control communication, and transfer information about the peripheral content and the other control communication to the peripheral media system.

17. The video system of claim 16 wherein the content delivery system comprises a satellite broadcast system and wherein the another content delivery system comprises a terrestrial transmission system.

18. The video system of claim 15 wherein the touch interface comprises a touch pad.

19. The video system of claim 15 wherein the touch interface comprises a touch screen.

* * * * *